United States Patent
Weng et al.

(10) Patent No.: US 8,417,854 B2
(45) Date of Patent: Apr. 9, 2013

(54) GENERIC DEVICE INTEGRATION WITHIN AN AUTO-ID SYSTEM

(75) Inventors: Jie Weng, Sunnyvale, CA (US); Tao Lin, Palo Alto, CA (US); Brian S. Mo, Palo Alto, CA (US); Richard J. Swan, Portola Valley, CA (US); Rama Gurram, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1910 days.

(21) Appl. No.: 11/027,691

(22) Filed: Dec. 30, 2004

(65) Prior Publication Data

US 2006/0168363 A1 Jul. 27, 2006

(51) Int. Cl.
- *G06F 3/00* (2006.01)
- *G06F 13/12* (2006.01)
- *G06F 13/42* (2006.01)
- *H04L 12/66* (2006.01)

(52) U.S. Cl.
USPC ........ 710/64; 710/2; 710/15; 710/29; 710/62; 710/105; 370/353

(58) Field of Classification Search ............ 710/15, 710/29, 2, 62, 64, 105; 709/224, 226, 206; 370/353
See application file for complete search history.

(56) References Cited

U.S. PATENT DOCUMENTS

| | | | | |
|---|---|---|---|---|
| 5,490,252 A * | 2/1996 | Macera et al. | | 709/249 |
| 5,675,738 A * | 10/1997 | Suzuki et al. | | 709/219 |
| 5,872,926 A * | 2/1999 | Levac et al. | | 709/206 |
| 5,915,008 A * | 6/1999 | Dulman | | 379/221.08 |
| 6,687,831 B1 * | 2/2004 | Albaugh et al. | | 726/7 |
| 6,735,630 B1 * | 5/2004 | Gelvin et al. | | 709/224 |
| 6,761,316 B2 * | 7/2004 | Bridgelall et al. | | 235/462.46 |
| 7,197,029 B1 * | 3/2007 | Osterhout et al. | | 370/353 |
| 2002/0059425 A1 * | 5/2002 | Belfiore et al. | | 709/226 |
| 2002/0129353 A1 * | 9/2002 | Williams et al. | | 717/175 |
| 2002/0161863 A1 * | 10/2002 | McGuire | | 709/220 |
| 2005/0120128 A1 * | 6/2005 | Willes et al. | | 709/232 |
| 2005/0193291 A1 * | 9/2005 | Subramanian et al. | | 714/710 |
| 2005/0199716 A1 * | 9/2005 | Shafer et al. | | 235/385 |
| 2005/0264401 A1 * | 12/2005 | Haller et al. | | 340/10.1 |
| 2006/0075159 A1 * | 4/2006 | Gesquiere et al. | | 710/29 |
| 2006/0077036 A1 * | 4/2006 | Roemerman et al. | | 340/5.61 |

OTHER PUBLICATIONS

Romer, Kay et al. "Smart Identification Frameworks for Ubiquitous Computing Applications." Wireless Networks. Nov. 2004: 689-700.*
Sarama, Sanjay. "Integrating RFID." Queue. Oct. 2004: 50-57.*

* cited by examiner

*Primary Examiner* — Idriss N Alrobaye
*Assistant Examiner* — Henry Yu
(74) *Attorney, Agent, or Firm* — Fish & Richardson P.C.

(57) ABSTRACT

Systems, methods and computer program products for generic device integration within an auto-id system. The system includes an auto-id node operable to collect data emitted by one or more automatic data acquisition devices, process the data, and make the data available to one or more enterprise applications, user interfaces, or other auto-id nodes. The auto-id node includes a device integration layer that is operable to handle communication between the auto-id node and different types of automatic data acquisition devices, device controllers, or device management systems.

20 Claims, 10 Drawing Sheets

GENERIC DEVICE INTEGRATION WITHIN AN AUTO-ID SYSTEM

BACKGROUND

Auto-identification (auto-id) systems are used, for example, to identify or otherwise obtain information about products that are to be manufactured, bought or sold, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical objects, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many other types of auto-id system devices exist. Examples include 2D bar code scanners, smart card devices/readers, voice recognition systems, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY OF THE INVENTION

Systems, methods and computer program products, implementing techniques for generic device integration within an auto-id system.

In one general aspect, a system implementing the techniques described herein includes an auto-id node operable to collect data emitted by one or more automatic data acquisition devices, process the data, and make the data available to one or more enterprise applications, user interfaces, or other auto-id nodes. The auto-id node includes a device integration layer that is operable to handle communication between the auto-id node and different types of automatic data acquisition devices, device controllers, or device management systems. Each device controller is operable to manage one or more of the automatic data acquisition devices and to relay data emitted by the automatic data acquisition devices to the auto-id node based on instructions from the auto-id node. Each device management system is operable to monitor the condition of one or more of the automatic data acquisition devices or device controllers and to notify the auto-id node about the condition.

Implementations may include one or more of the following features.

The device integration layer may include a plurality of adapters, a plurality of communicators, and a plurality of converters. Each adapter may be operable to handle communication between the auto-id node and one type of automatic data acquisition device, device controller or device management system. Each communicator may be operable to handle data transport aspects of the communication between the auto-id node and one type of automatic data acquisition device, device controller or device management system. Each converter may be operable to handle data conversion aspects of the communication between the auto-id node and one type of automatic data acquisition device, device controller or device management system.

The plurality of adapters may be represented by a single base class and multiple specific classes, the single base class implementing functionality common to all the adapters in the plurality of adapters, the specific classes implementing functionality specific to each of the adapters in the plurality of adapters.

The different types of automatic data acquisition devices, device controllers or device management systems may use different communication protocols, communication channels, communication modes or messaging formats.

The different communication protocols may include HTTP (Hypertext Transfer Protocol) and TCP/IP (Transmission Control Protocol/Internet Protocol).

The different communication channels may include a publish-subscribe channel, a point-to-point channel and socket channel.

The different communication channels may include SOAP (Simple Object Access Protocol) and JSP (Java Server Pages).

The different communication modes may include an on-line communication mode and an off-line communication mode.

The different types of automatic data acquisition devices may include periodic devices that emit periodic data streams and aperiodic devices that emit aperiodic data streams.

The aperiodic devices may include RFID (Radio Frequency Identification) tag readers.

In another general aspect, the techniques include receiving a connection request from an auto-id component to be connected to an auto-id node, the connection request specifying one or more parameters of the auto-id component, identifying an adapter that matches the parameters, and generating an instance of the matching adapter. The auto-id component is an automatic data acquisition device, a device controller, or a device management system. The auto-id node is operable to collect data emitted by automatic data acquisition devices, process the data and make the data available to enterprise applications, user interfaces, or other auto-id nodes. The device controller is operable to manage one or more of the automatic data acquisition devices and to relay data emitted by the automatic data acquisition devices to the auto-id node based on instructions from the auto-id node. The device management system is operable to monitor the condition of one or more automatic data acquisition devices or device controllers and to notify the auto-id node about the condition.

Implementations may include one or more of the following features.

Identifying an adapter that matches the parameters may include searching a repository local to the auto-id node and if a matching adapter is not found in the local repository, searching a global repository remote to the auto-id node.

The parameters may include one or more of a communication protocol, a communication mode, a communication channel, a messaging format and a product name.

The parameters may include an address for the global repository to be searched.

The techniques may further include using the generated instance to handle communication between the auto-id node and the auto-id component.

The techniques can be implemented to realize one or more of the following advantages.

An auto-id node implementing the techniques described herein can communicate with different types of devices, device controllers, device management systems.

An auto-id node can be easily extended to accommodate new types of devices, device controllers, and device management systems.

An auto-id node can dynamically add a new connection to a device, device controller, or device management system. The new connection can be configured for a new type of device, device controller, or device management system.

The auto-id node can be developed independently of the devices, device controllers, device management systems.

One implementation provides all of the above advantages.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
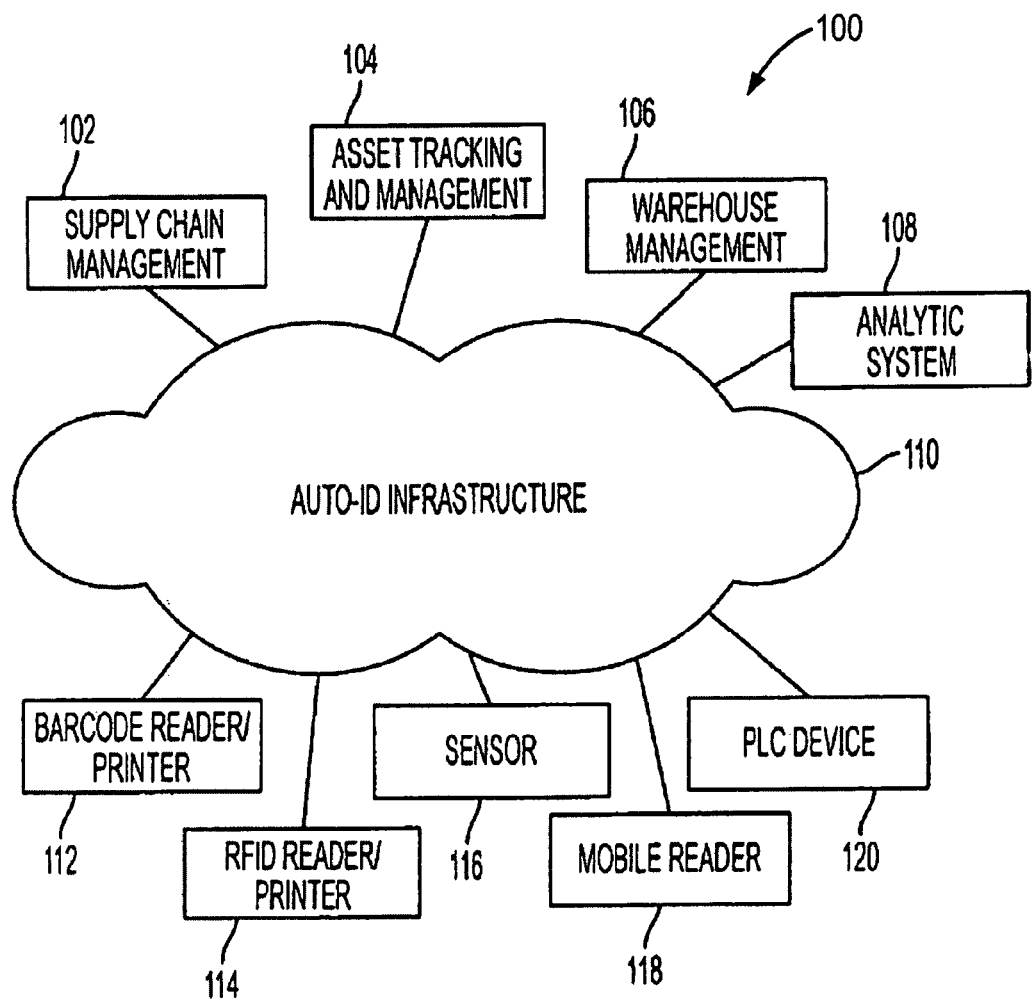
FIG. 1 is a network diagram of an auto-id system.

FIG. 1 is a network diagram of an auto-id system 100. In FIG. 1, a plurality of enterprise applications include, as examples, a supply chain management application 102, which may be used by the enterprise to oversee the process of producing/buying, shipping, and selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, or reasons for delivery delay), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programable Logic Controller (PLC) device represents a digital controller used for applications such as on/off control, timing, logic, counting and sequencing, and also may be controlled by a device controller system, described in more detail below.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application 106 may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
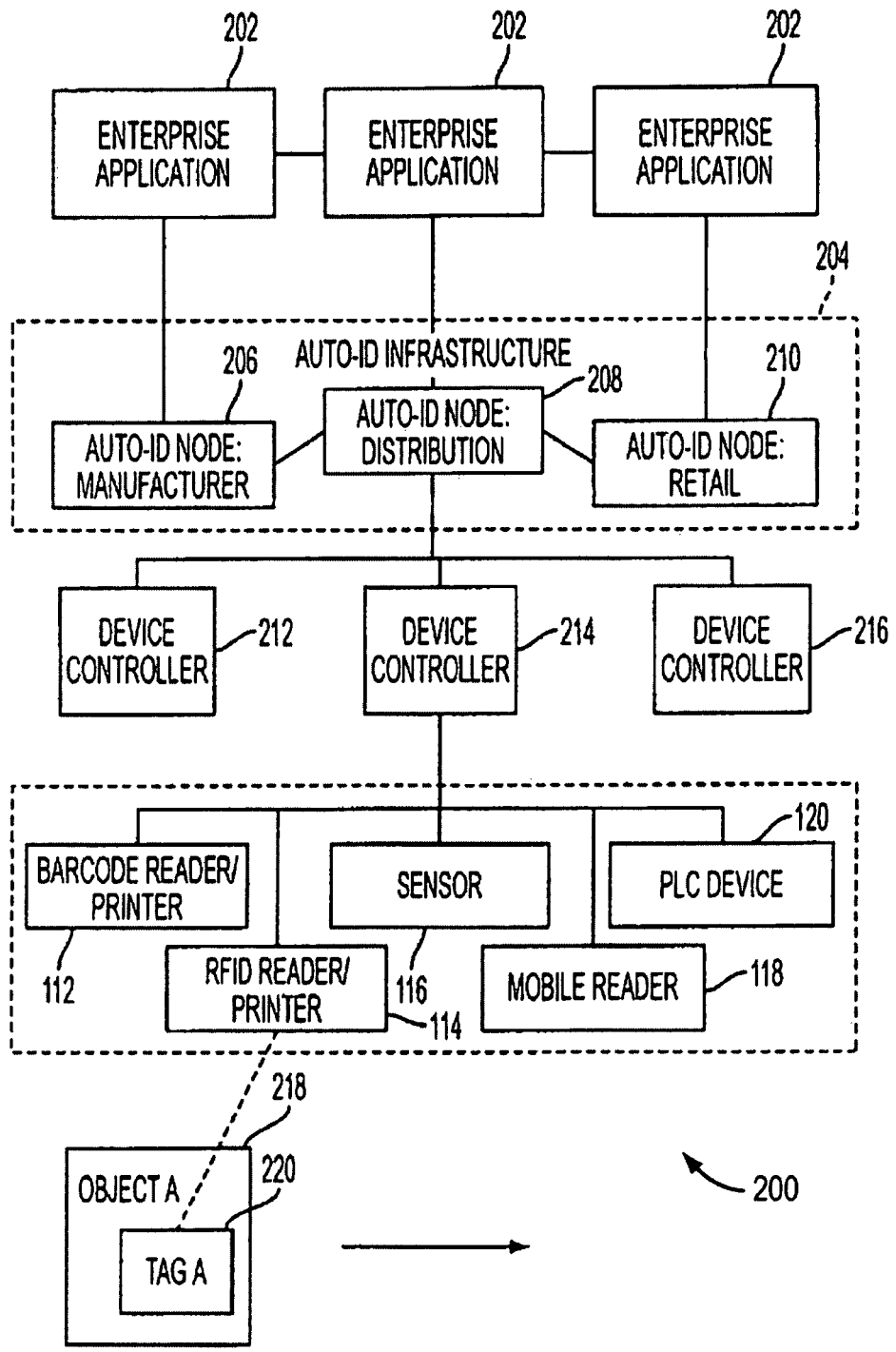
FIG. 2 is a block diagram of a system 200 illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or all of the middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s), and information for multiple objects that has been collected and combined for a desired purpose.

The auto-id nodes 206, 208, and 210 may be strategically placed throughout the enterprise, or across multiple enterprises. For example, the auto-id node 206 may be located at a manufacturing site, while the auto-id node 208 may be located at a product distribution site, and the auto-id node 210 may be located at a retail store. In this way, information that is particular to an actual setting of an auto-id node may be obtained and retained only at that particular node.

For example, the auto-id node 210 at a retail store may be interested in tracking a retail price of an item, or a number of items on a shelf of the retail store. Such information may not be useful to the auto-id node 206 at a manufacturing location, but may be partially useful to the auto-id node 208 at the distribution location. For example, the auto-id node at the distribution location 208 may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantify of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middlware that are common to all of the enterprise applications.

Figure 3:
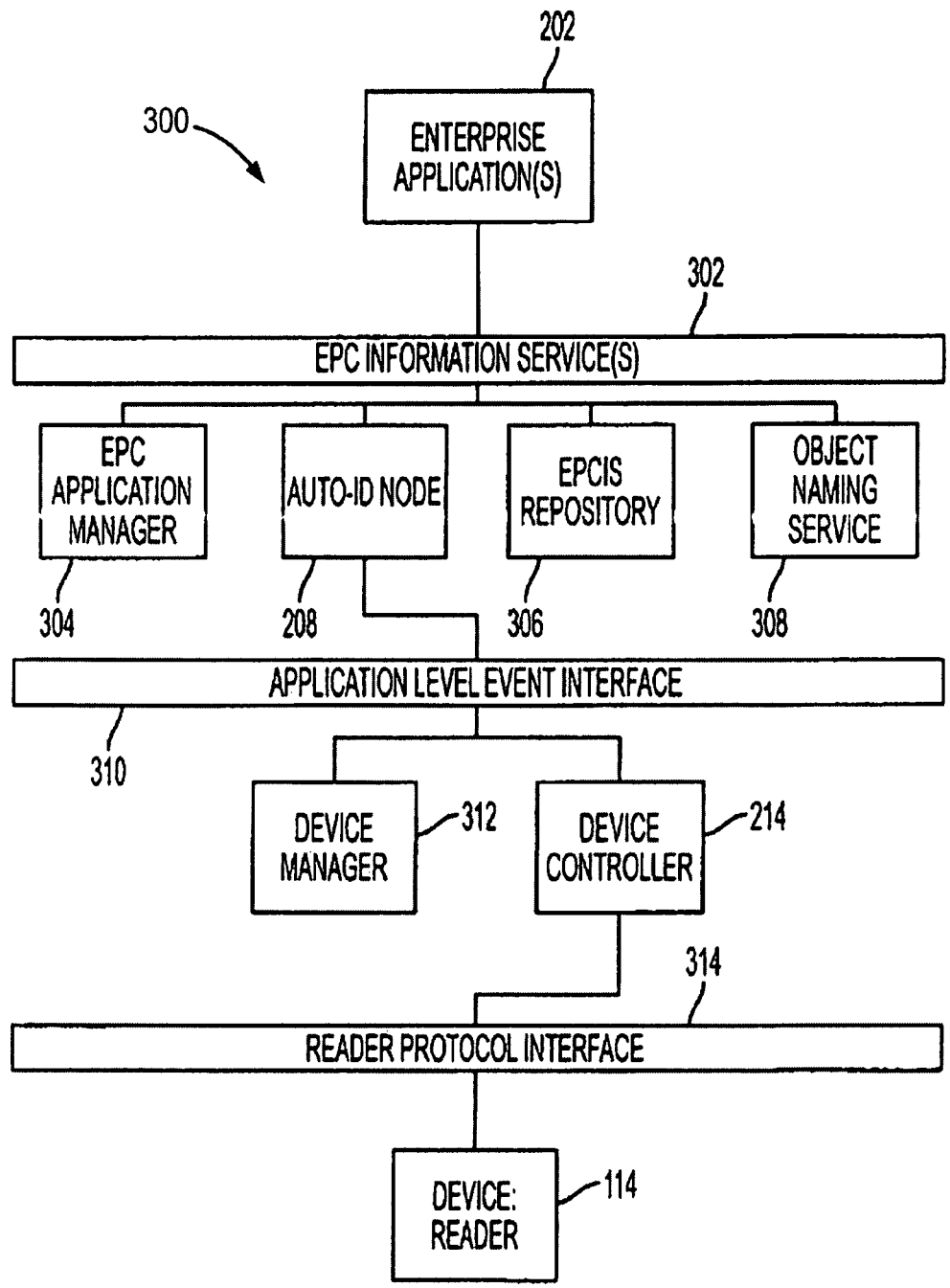
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme which multiple organizations and enterprises have agreed to use in uniquely designating and identifying their respective products, goods, or services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
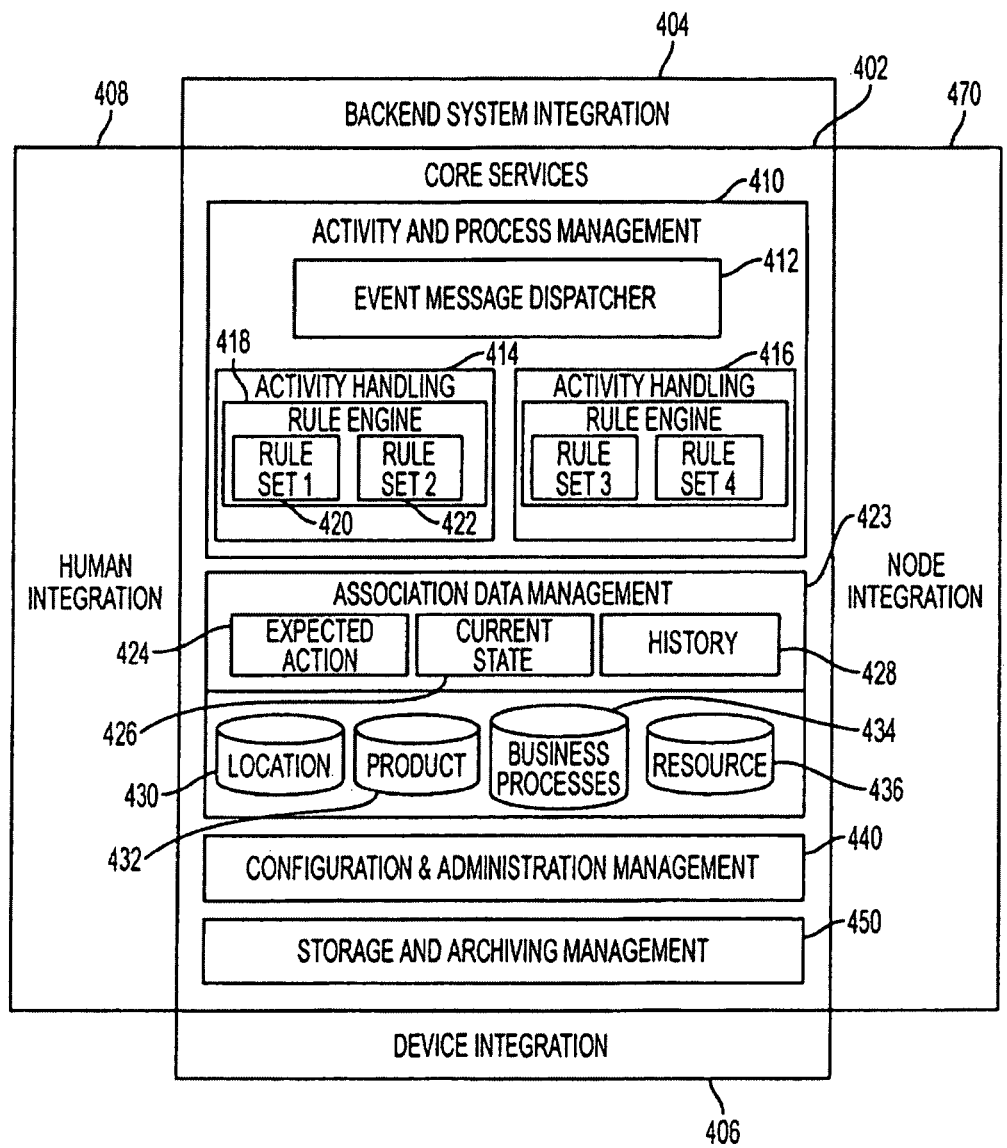
FIG. 4 is a block diagram of the auto-id node(s) of FIGS. 2 and 3.

FIG. 4 is a block diagram of the auto-id node(s) 206, 208, and 210 of FIGS. 2 and/or 3. In FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2.

In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The node integration layer 470, along with the backend system integration layer 404, the device integration layer 406, and the human integration layer 408, will be described in more detail below under the heading "Integration Layers".

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make a determination regarding a status of the tracked object(s). In this way, the auto-id node 400 is able to move an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23 AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414/416 based on the type of the event, (e.g., a device reader event, or a neighboring auto-id node event, or a backend system event), the time of the event ( e.g., whether the event is a day time event or a night time event), or virtually any other criteria by which the activity handlers may be delegated to handle the events.

The activity handler 414/416 analyzes the information about an event contained therein, along with any known data that may be associated with the event and accessed when needed, and compares this information with a determined business process(es) associated with the object of the event. In so doing, the activity handler 414/416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414/416 also may update its own status and/or tracking data with respect to the object, in order to reflect the changes represented by the event(s), and to more accurately reflect where the object stands in the business process.

The business process that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a nighttime shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed.

The rule set 420 may, for example, be assigned to the activity handler 414/416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414,416 to keep track of the life cycle of each event object, or a portion thereof, and may update the status of the event objects in real-time, in response to receiving event. For example, the association data management module 423 may include data about the object as it progresses through its lifecycle from, e.g., manufacturing to retail sale, or from a return of the object until the object is re-packaged for retail sale as a refurbished object.

The association data management module 423 generally tracks two classes of data regarding a particular object(s). Specifically, dynamic data refers to data that is changing in time, or that may be expected to change, or that has changed as the associated object moves through time. Conversely, static refers to data that generally is not changing in time, or that is changing only infrequently. Different parameters may be considered to be dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414,416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that are not generally expected to be required to update on a regular or continuous basis. Rather, the association and data management module 423 may communicate with outside sources to update the static data on a periodic or semi-periodic basis. Accordingly, such static data may not generally be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object was made). In general, though, the static information will be considered not to change on an event-by-event basis.

Similarly, a product database 432 may include detailed descriptions of the products or objects that are being tracked, including such descriptions that change, but that, again, do not generally change on an event-by-event basis. The product database 432 may store such information, or may look up the information from an outside source, using, for example, a universal product id (e.g. the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model(s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse. Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420,422, manage the integration logic with respect to modules 404-408, or establish connections with outside services (e.g., to update the static data storage 430-436). Finally in FIG. 4, a storage and archiving management module 450 manages the data storage and archiving of the core services module 410. For example, the module 450 may be used to archive data that is used infrequently, or that has not been used for some pre-determined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Integration Layers

Figure 5A:
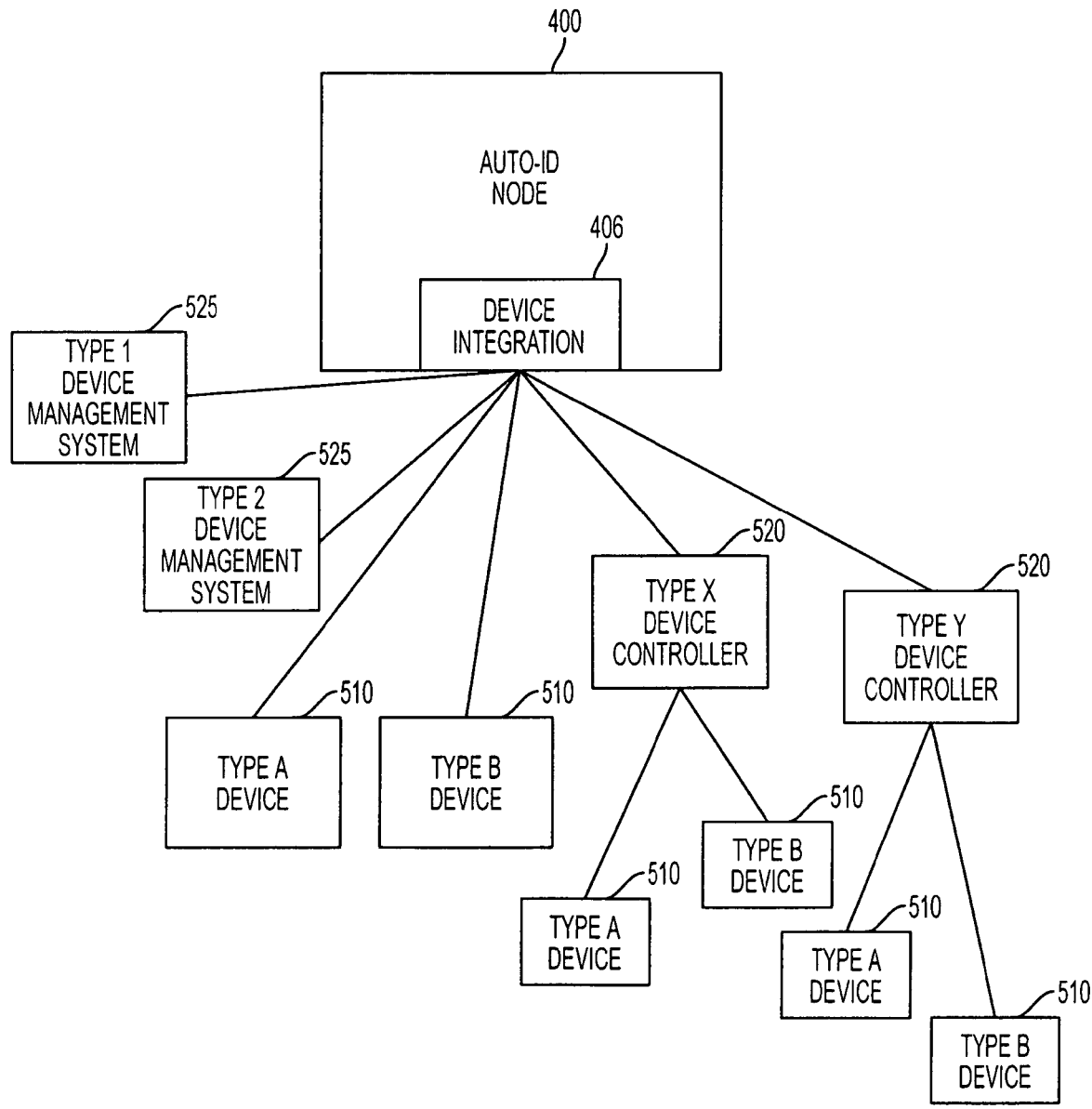
FIG. 5A illustrates device integration.

As previously described, the device integration layer 406 handles communication between an auto-id node 400 and multiple devices. As shown in FIG. 5A, the devices can include different types of automatic data acquisition devices 510, device controllers 520 and device management systems 525. As shown in FIG. 5A, the auto-id node 400 can communicate with a particular device 510 directly, or through a device controller 520.

The data acquisition devices 510 can include both periodic devices and aperiodic devices. Periodic devices are devices that emit periodic data streams. Aperiodic devices are devices that emit aperiodic data streams. A periodic stream is a continuous stream of data occurring at regular time intervals (e.g., one data value every n milliseconds), as opposed to an aperiodic stream, where data is emitted at irregular intervals, for example, only when a tagged item is detected. Examples of periodic devices are sensor devices for measuring one or more physical properties (for example, temperature, humidity, acceleration, pressure, light, position, movement or noise), and servers that provide continuous data feeds (for example, of stock information). An example of an aperiodic device is an RFID (Radio Frequency Identification) tag reader. Examples of specific types of RFID tag readers are readers manufactured by Alien Technologies of Morgan Hill, Calif. and readers manufactured by Matrics Incorporated of Rockland, Md.

As previously described, a device controller 520 is software operable to manage one or more of the automatic data acquisition devices 510 and to relay data emitted by the automatic data acquisition devices 510 to an auto-id node 400 based on instructions from the auto-id node 400.

A device management system 525 monitors the condition of devices and/or device controllers and notifies the auto-id node 400 about the current condition. The notification can occur periodically or when the condition is abnormal. The device management system 525 can also support remote management, such as firmware uploading and system reconfiguration.

Figure 5B:
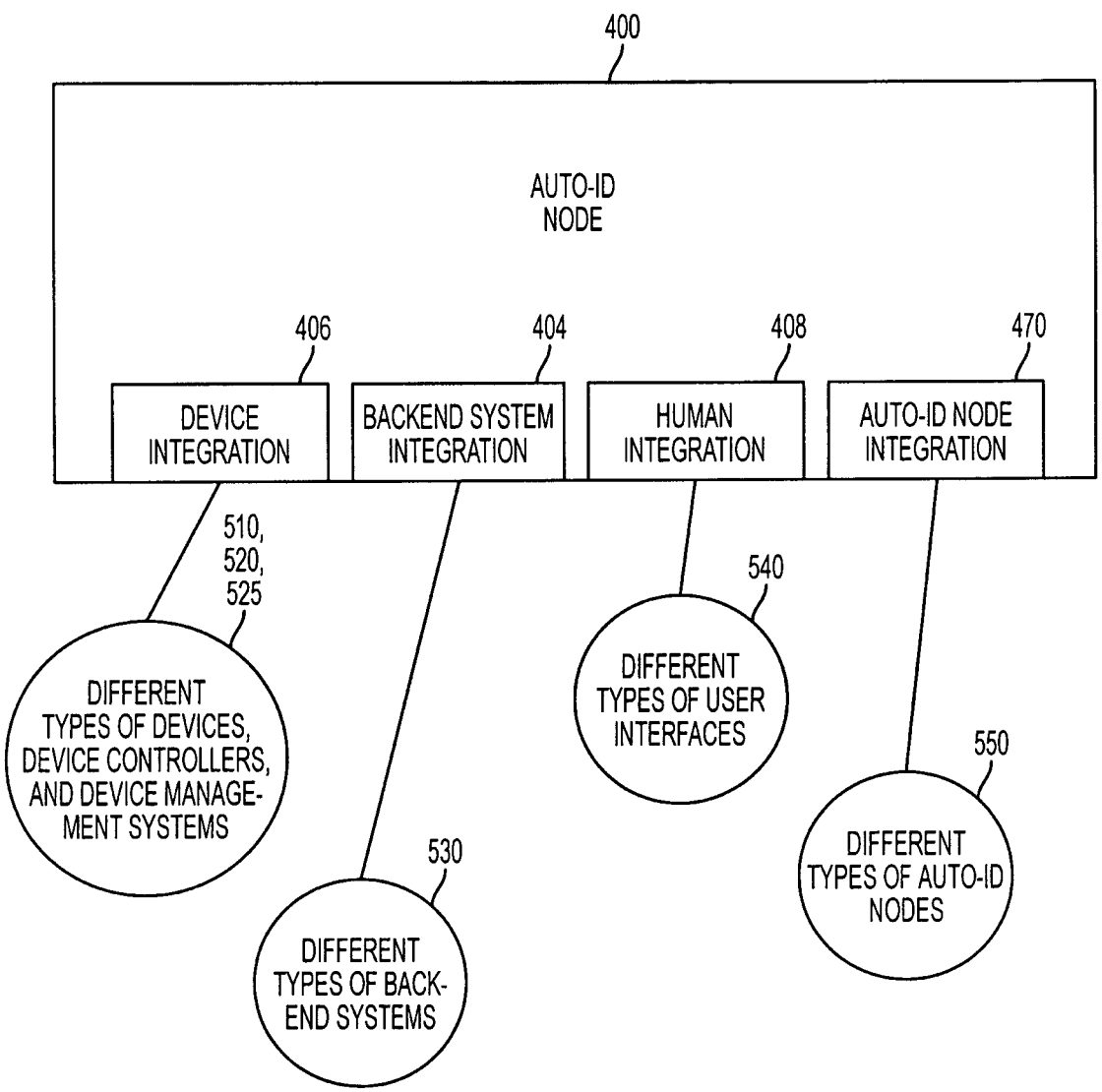
FIG. 5B illustrates device integration, backend system integration, human integration, and auto-id node integration.

As shown in FIG. 5B, the backend system integration layer 404, the human integration layer 408, and the node integration layer 470 of the auto-id node 400 handle communication with different types of backend systems 530, user interfaces 540, and auto-id nodes 550, respectively.

The different types of backend systems 530 can include logistic systems, asset tracking and management systems, maintenance service systems, warehouse management systems, financial systems, analytical systems and reporting systems. Furthermore, taking warehouse management systems as an example, there can also be different implementations, for example, an Oracle implementation and an SAP implementation.

The different types of user interfaces 540 can include web-based or other server-based user interfaces, stand-alone user interfaces, and mobile interfaces. The user interfaces 540 can also be configured differently for different users.

The auto-id nodes 550 can include nodes located in different geographic locations. Taking a supply chain example, the nodes can be located in a manufacturing site, a distribution center and a retail center. The auto-id nodes 550 can include nodes of different auto-id systems developed by different companies, for example, EPCIS Server, available from Verisign of Mountain View, Calif. and Auto-ID Node, available from SAP AG of Walldorf(Baden), Germany.

In this specification, devices 510, device controllers 520, device management systems 525, backend systems 530, user interfaces 540, and auto-id nodes 550, will be referred to as auto-id components.

The auto-id components can differ in a variety of ways, including, but not limited to, the type of communication protocol, communication channel, communication mode, or messaging format used. For example, some of the auto-id components may communicate using HTTP (Hypertext Transfer Protocol), while others may communicate using a socket-based communication protocol, for example, TCP/IP (Transmission Control Protocol/Internet Protocol). Each general type of communication protocol can also have several different variations. For example, one well-known variation of HTTP is secure HTTP (HTTPs).

For TCP/IP, the communication channel can be a publisher-subscriber channel, a point-to-point channel or a socket channel. Examples are MQSeries available from IBM of Armonk, N.Y., SonicMQ available from Sonic Software Corporation of Bedford, Mass., WebLogic Server available from BEA Systems, of San Jose, Calif., and XI, available from SAP AG of Walldorf (Baden), Germany. Most of the systems above support both the publisher-subscriber and the point-to-point channels.

For HTTP, the communication channel can be SOAP (Simple Object Access Protocol) and JSP (Java Server Pages).

The communication mode can be an on-line communication mode or an off-line communication mode. In the on-line communication mode, the auto-id node and the auto-id component maintain a continuous connection. That is, even when the auto-id node and the auto-id component are not sending messages to each other, the connection remains open. In the off-line communication mode, the auto-id node and the auto-id component do not maintain a continuous connection with each other. Instead, they only connect temporarily, for example, only to send a message, or only when network access is available. The off-line mode can be used by mobile devices or mobile user interfaces, for example.

Without the integration layers 404, 406, 408, 470, the auto-id node 400 would only be able to support a particular communication protocol, communication channel, communication mode, and/or messaging format, and would not be able to integrate with auto-id components that do not use the particular communication protocol, communication channel, communication mode, and/or messaging format supported by the auto-id node 400.

With the integration layers 404, 406, 408, 470, the auto-id node 400 can integrate with a variety of different types of auto-id components that use different communication protocols, communication channels, communication modes and/or messaging formats. In addition, as will be described below, the layers 404, 406, 408, 470 can easily be extended to accommodate new types of auto-id components that are developed in the future.

Figure 6:
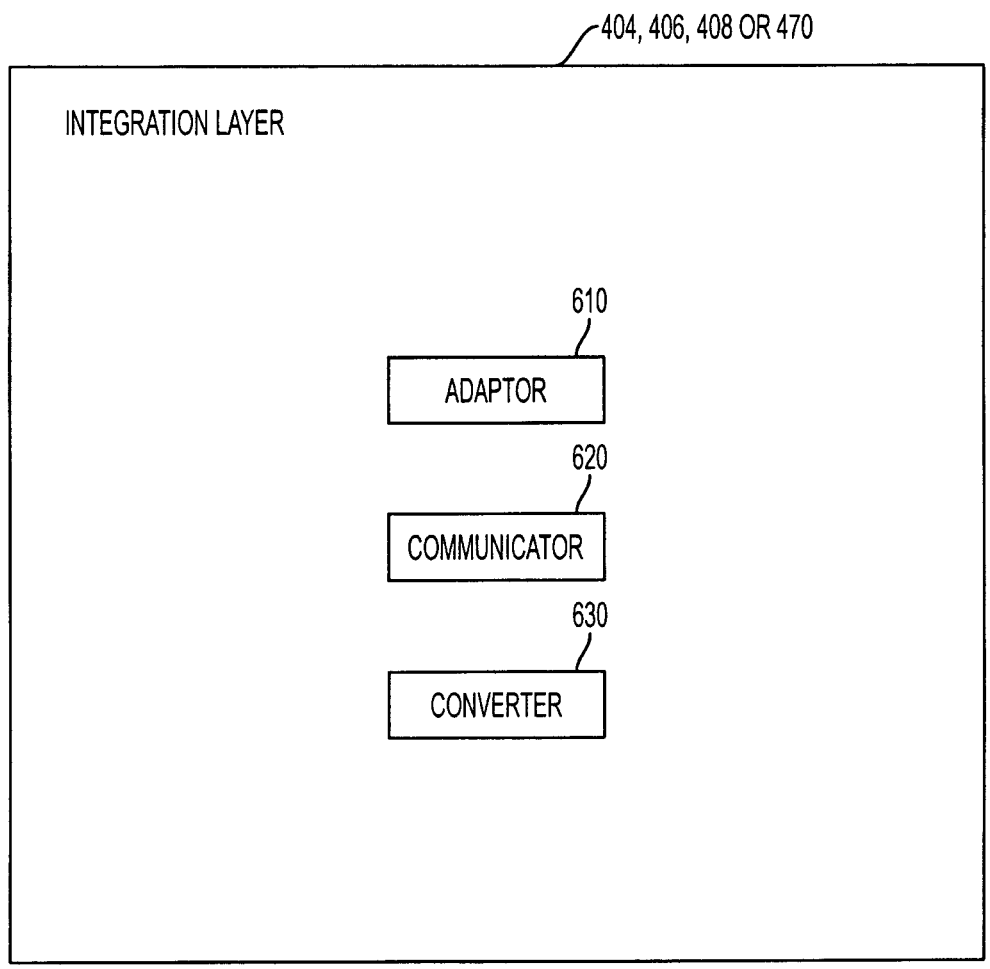
FIG. 6 illustrates an integration layer.

As shown in FIG. 6, each of the integration layers 404, 406, 408, and 470 includes an adapter 610, a communicator 620, and a converter 630.

The adapter 610 handles communication between the auto-id node 400 and the auto-id components. The adapter 610 uses the communicator 620 and the converter 630 to handle the communication.

The communicator 620 handles the data transport aspect of the communication. The communicator 620 supports a variety of different types of communication protocols, communication modes, and communication channels, including, but not limited, to the communication protocols, communication modes, and communication channels described earlier.

The converter 630 handles the data conversion aspect of the communication. The converter 630 converts data received from a connecting auto-id component into an internal message format understood by the auto-id node 400. Conversely, the converter 640 also converts data from the auto-id node 400 into an external message format understood by the connecting auto-id component.

Figure 7:
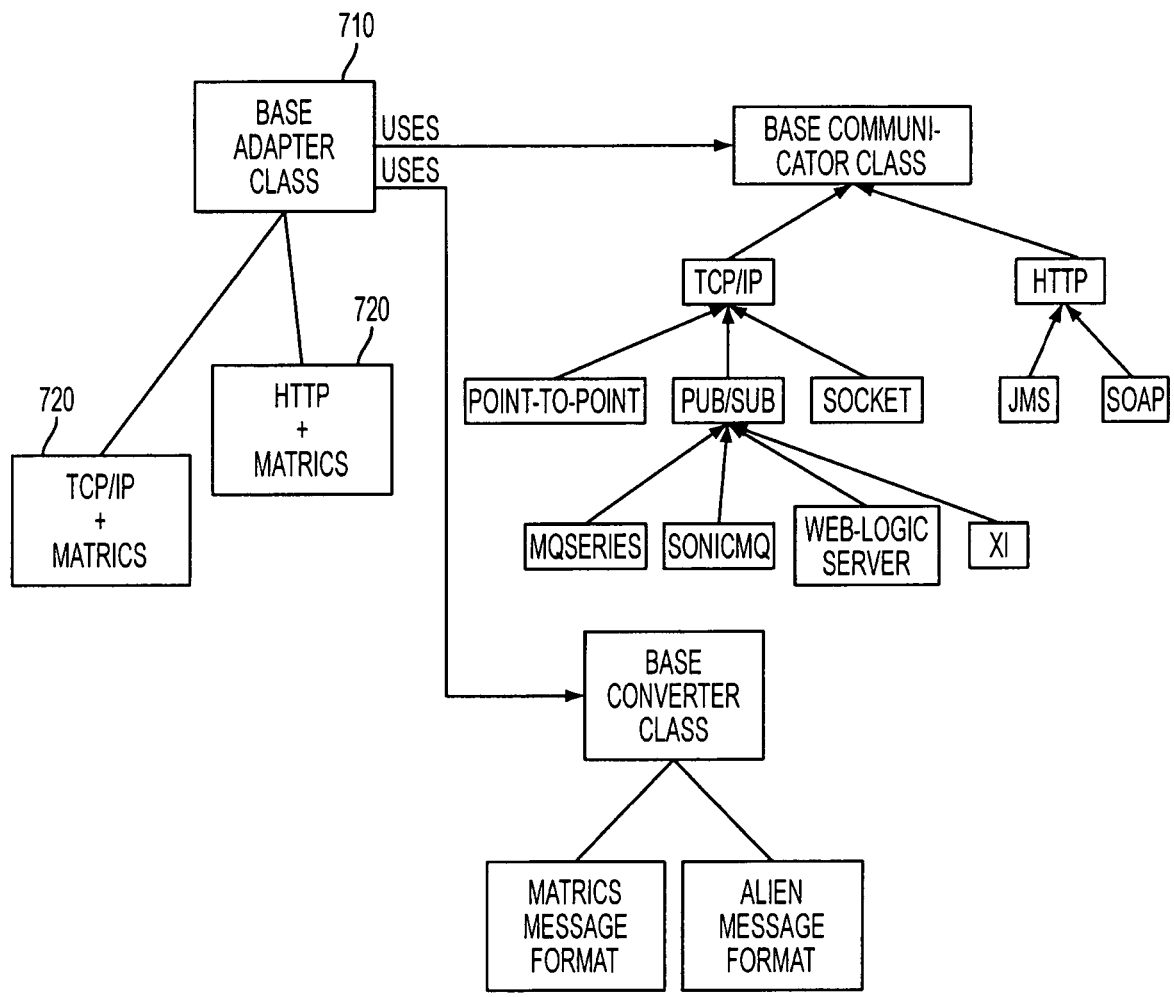
FIGS. 7 and 8 illustrate an object-oriented implementation of the integration layer.

As shown in FIG. 7, in an object-oriented implementation of the integration layers 404, 406, 408, 470, the adapter 610 can be represented by a base adapter class 710 and one or more specific adapter classes 720. The base adapter class 710 implements the functionality generic to all of the specific adapter classes 720. The specific adapter classes 720 extend the generic functionality with additional functionality that supports specific communication protocols, communication channels, communication modes and messaging formats.

The communicator 620 and the converter 630 can also be implemented using a similar set of base classes and specific classes. By separating the functionality of the integration layers 404, 406, 408, 470 into base classes and specific classes, the generic integration layers 404, 406, 408, 470 can be easily extended to accommodate additional specific communication protocols, communication channels, communication modes and messaging formats.

Figure 8:
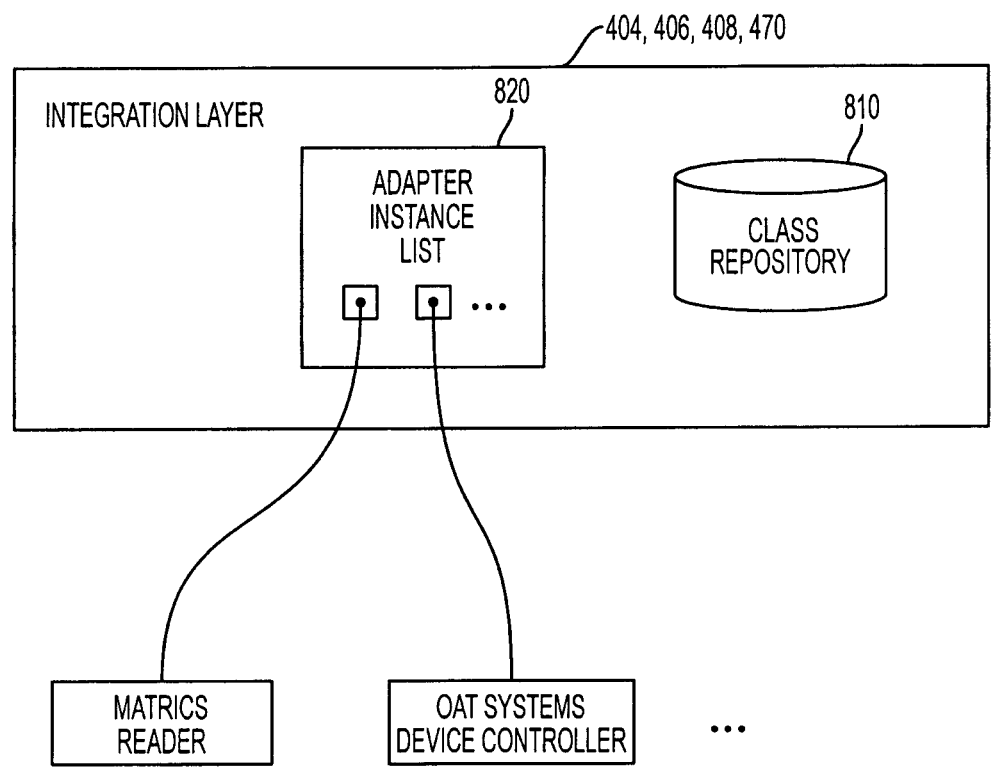

As shown in FIG. 8, the classes implementing the adapter 610, communicator 620, and converter 630 can be stored in a class repository 810. The class repository 810 can be located within the integration layers 404, 406, 408, 470 (as illustrated), or alternatively, can be located at a separate location accessible to the auto-id node 400.

For each auto-id component to be connected to the auto-id node 400, an instance of the adapter 610 is generated and added to an adapter instance list 820 maintained by the integration layers 404, 406, 408, 470.

The generation of an appropriate adapter instance for a given auto-id component can be performed manually by a human operator. The human operator can examine the auto-id component and then generate an adapter instance that supports the specific communication protocol, communication channel, communication mode, and/or messaging format of the given auto-id component.

Figure 9:
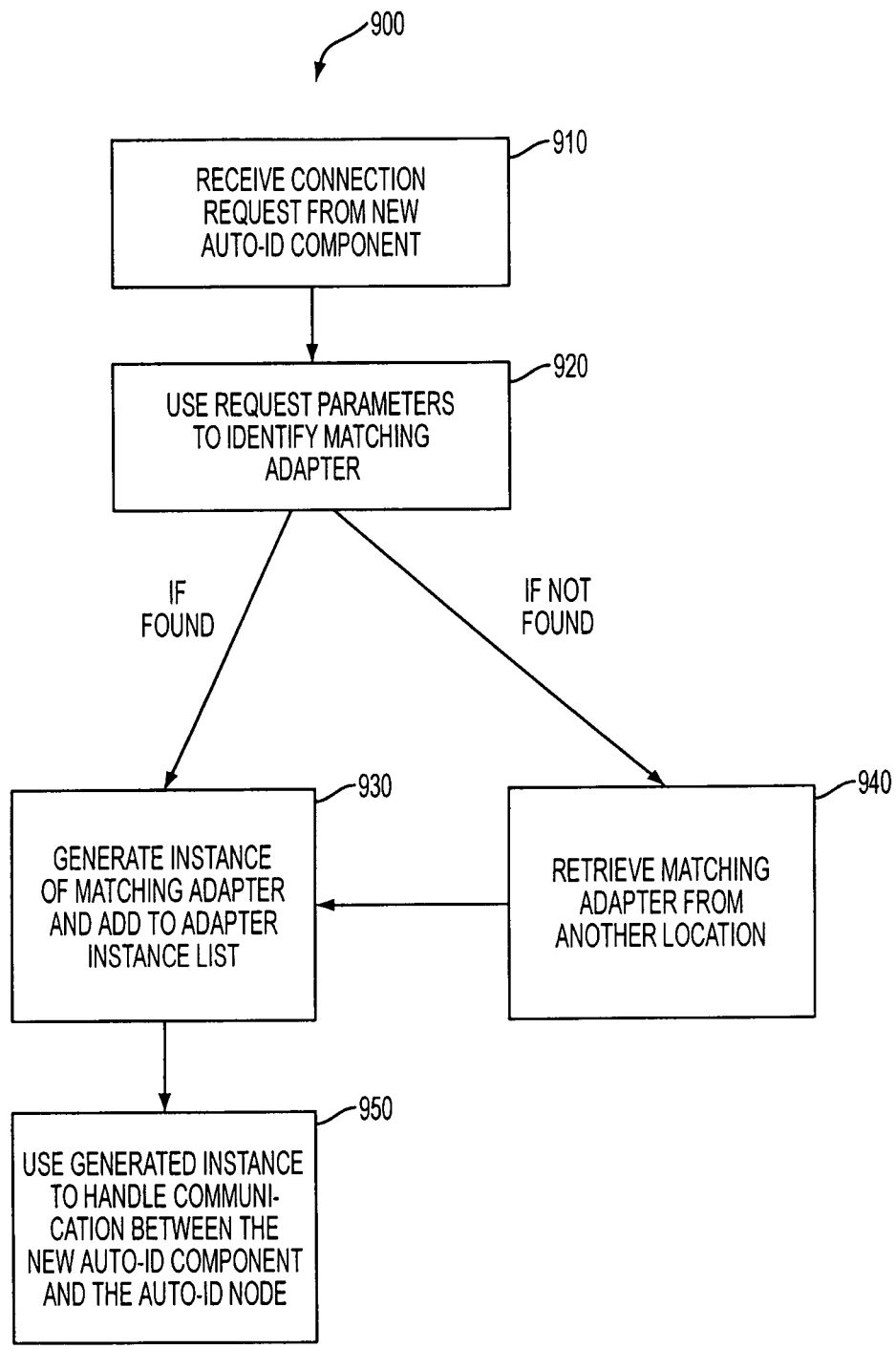
FIG. 9 illustrates a process for generating adapters.

Alternatively, as illustrated in FIG. 9, the generation of an appropriate adapter for a given auto-id component can be performed automatically by the integration layers 404, 406, 408, 470.

In a process 900, illustrated in FIG. 9, an integration layer 404, 406, 408, or 470 receives a connection request from a new auto-id component to be connected to the auto-id node 400 (step 910). The connection request specifies one or more parameters of the new auto-id component. For example, the parameters can identify the product name, type, or version number of the new auto-id component. The parameters can also specify the communication protocol, communication channel, communication mode and/or messaging format used by the new auto-id component.

Using the parameters of the connection request, the integration layer 404, 406, 408, or 470 searches the class repository 810 to identify a specific adapter class 720 that uses the specific communication protocol, communication channel, communication mode, and/or messaging format specified by the connection request parameters (step 920).

If a matching specific adapter class 720 is found in the class repository 810, then the integration layer 404, 406, 408, or 470 generates an instance of the matching specific adapter class 720 and adds the generated instance to the adapter instance list 820 (step 930).

Otherwise, if no matching specific adapter class 720 is found, then the integration layer 404, 406, 408, or 470 retrieves a matching specific adapter class from another location, for example, from a remote server whose address is specified in the connection request parameters (step 940). The generic integration layer 404, 406, 408, or 470 then generates an instance of the matching specific adapter class 720 and adds the generated instance to the adapter instance list (step 930).

The generated instance is then used by the generic integration layer 404, 406, 408, or 470 to handle communication between the auto-id component and the auto-id node (step 950). Thus, the above-described process 900 allows an auto-id node 400 to dynamically add a new connection to an auto-id component. Furthermore, the new connection can be configured for a new type of backend system, user interface, device, device controller, device management system, or auto-id node.

The various implementations of the invention and all of the functional operations described-in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a backend component (e.g., a data server), a middleware component (e.g., an application server), or a front-end component (e.g., a client computer having a graphical user interface or a Web browser through which a user can interact with an implementation of the invention), or any combination of such backend, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations can be implemented and are within the scope of the following claims. For example, the operations of the invention can be performed in a different order and still achieve desirable results. In certain implementations, multitasking and parallel processing may be preferable. Other implementations are within the scope of the following claims

What is claimed is:

1. A computer-implemented method comprising:
   receiving, at an integration layer, a connection request from an auto-id component to be connected to an auto-id node, the connection request specifying one or more communication parameters of the auto-id component;
   instantiating a generic adaptor class for effecting communication between the auto-id node and the auto-id component, the generic adaptor implementing functionality common to multiple different, specific adaptor classes stored in a class repository of the integration layer;
   instantiating a generic communicator class for effecting a data transport aspect of the communication between the auto-id node and the auto-id component, the generic communicator class implementing functionality common to multiple different, specific communicator classes stored in the class repository, and the generic communicator class being a component of the generic adaptor class;
   instantiating a generic converter class for effecting a data conversion aspect of the communication between the auto-id node and the auto-id component, the generic converter class implementing functionality common to multiple different, specific converter classes stored in the class repository, and the generic converter class being a component of the generic adaptor class;
   identifying, from among the multiple different adaptor, communicator, and converter classes stored in the class repository, a specific adaptor, a specific communicator class, and a specific converter class, respectively, based on the specified communication parameters;
   instantiating the identified specific adaptor, communicator, and converter classes;
   adding the identified specific adaptor, communicator, and converter classes to an instance list and
   effecting the communication between the auto-id component and the auto-id node using the instantiated generic adaptor, communicator, and converter classes and the instantiated specific adaptor, communicator, and converter classes.

2. The method of claim 1, wherein identifying the specific adaptor, communicator, and converter class further comprises searching a repository local to the auto-id node and, if a matching adapter is not found in the local repository, searching a global repository remote to the auto-id node.

3. The method of claim 1, wherein the communication parameters comprise a communication protocol, a communication mode, a communication channel, a messaging format and a product name.

4. The method of claim 1, wherein the communication parameters comprise an address for a global repository to be searched.

5. The method of claim 1, wherein the specific adaptor class further comprises a HTTP (Hypertext Transfer Protocol) or a TCP/IP (Transmission Control Protocol/Internet Protocol) adaptor class.

6. The method of claim 1, wherein the specific adaptor class further comprises a publish-subscribe channel, a point-to-point channel, or a socket channel adaptor class.

7. The method of claim 1, wherein the specific adaptor class further comprises a SOAP (Simple Object Access Protocol) or a JSP (Java Server Pages) adaptor class.

8. The method of claim 1, wherein the specific adaptor class further comprises an n on-line communication mode or an off-line communication mode adaptor class.

9. The method of claim 1, wherein the specific adaptor class further comprises a periodic communication or an aperiodic communication adaptor class.

10. A system comprising:
one or more computers; and
a computer-readable medium coupled to the one or more computers having instructions stored thereon which, when executed by the one or more computers, causes the one or more computers to perform operations comprising:
receiving, at an integration layer, a connection request from an auto-id component to be connected to an auto-id node, the connection request specifying one or more communication parameters of the auto-id component,
instantiating a generic adaptor class for effecting communication between the auto-id node and the auto-id component, the generic adaptor implementing functionality common to multiple different, specific adaptor classes stored in a class repository of the integration layer,
instantiating a generic communicator class for effecting a data transport aspect of the communication between the auto-id node and the auto-id component, the generic communicator class implementing functionality common to multiple different, specific communicator classes stored in the class repository, and the generic communicator class being a component of the generic adaptor class,
instantiating a generic converter class for effecting a data conversion aspect of the communication between the auto-id node and the auto-id component, the generic converter class implementing functionality common to multiple different, specific converter classes stored in the class repository, and the generic converter class being a component of the generic adaptor class,
identifying, from among the multiple different adaptor, communicator, and converter classes stored in the class repository, a specific adaptor, a specific communicator class, and a specific converter class, respectively, based on the specified communication parameters,
instantiating the identified specific adaptor, communicator, and converter classes,
adding the identified specific adaptor, communicator class, and converter classes to an instance list, and
effecting the communication between the auto-id component and the auto-id node using the instantiated generic adaptor, communicator, and converter classes and the instantiated specific adaptor, communicator, and converter classes.

11. The system of claim 10, wherein identifying the specific adaptor, communicator, and converter class further comprises searching a repository local to the auto-id node and, if a matching adapter is not found in the local repository, searching a global repository remote to the auto-id node.

12. The system of claim 10, wherein the communication parameters comprise a communication protocol, a communication mode, a communication channel, a messaging format and a product name.

13. The system of claim 10, wherein the communication parameters comprise an address for a global repository to be searched.

14. The system of claim 10, wherein the specific adaptor class further comprises a HTTP (Hypertext Transfer Protocol) or a TCP/IP (Transmission Control Protocol/Internet Protocol) adaptor class.

15. The system of claim 10, wherein the specific adaptor class further comprises a publish-subscribe channel, a point-to-point channel, or a socket channel adaptor class.

16. The system of claim 10, wherein the specific adaptor class further comprises a SOAP (Simple Object Access Protocol) or a JSP (Java Server Pages) adaptor class.

17. The system of claim 10, wherein the specific adaptor class further comprises an n on-line communication mode or an off-line communication mode adaptor class.

18. The system of claim 10, wherein the specific adaptor class further comprises a periodic communication or an aperiodic communication adaptor class.

19. A non-transitory computer-readable medium encoded with a computer program comprising instructions that, when executed, operate to cause a computer to perform operations comprising:
receiving, at an integration layer, a connection request from an auto-id component to be connected to an auto-id node, the connection request specifying one or more communication parameters of the auto-id component;
instantiating a generic adaptor class for effecting communication between the auto-id node and the auto-id component, the generic adaptor implementing functionality common to multiple different, specific adaptor classes stored in a class repository of the integration layer;
instantiating a generic communicator class for effecting a data transport aspect of the communication between the auto-id node and the auto-id component, the generic communicator class implementing functionality common to multiple different, specific communicator classes stored in the class repository, and the generic communicator class being a component of the generic adaptor class;
instantiating a generic converter class for effecting a data conversion aspect of the communication between the auto-id node and the auto-id component, the generic converter class implementing functionality common to multiple different, specific converter classes stored in the class repository, and the generic converter class being a component of the generic adaptor class;
identifying, from among the multiple different adaptor, communicator, and converter classes stored in the class repository, a specific adaptor, a specific communicator class, and a specific converter class, respectively, based on the specified communication parameters;
instantiating the identified specific adaptor, communicator, and converter classes;
adding the identified specific adaptor, communicator class, and converter classes to an instance list; and
effecting the communication between the auto-id component and the auto-id node using the instantiated generic adaptor, communicator, and converter classes and the instantiated specific adaptor, communicator, and converter classes.

20. The computer-readable medium of claim 19, wherein identifying the specific adaptor, communicator, and converter class further comprises searching a repository local to the auto-id node and, if a matching adapter is not found in the local repository, searching a global repository remote to the auto-id node.

* * * * *